US012691419B2

(12) United States Patent
Tang et al.

(10) Patent No.: US 12,691,419 B2
(45) Date of Patent: Jul. 28, 2026

(54) PREPARATION OF METALLOCENE CONTAINING CATIONIC POLYMERS FOR ANION EXCHANGE APPLICATIONS

(71) Applicant: University of South Carolina, Columbia, SC (US)

(72) Inventors: Chuanbing Tang, Columbia, SC (US); Tianyu Zhu, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 18/449,133

(22) Filed: Aug. 14, 2023

(65) Prior Publication Data

US 2023/0390707 A1 Dec. 7, 2023

Related U.S. Application Data

(63) Continuation of application No. 17/158,394, filed on Jan. 26, 2021, now Pat. No. 11,738,311, which is a (Continued)

(51) Int. Cl.
*B01D 67/00* (2006.01)
*B01D 71/82* (2006.01)
(Continued)

(52) U.S. Cl.
CPC ..... *B01D 67/0079* (2013.01); *B01D 67/0006* (2013.01); *B01D 71/82* (2013.01); *B01J 45/00* (2013.01); *B01J 47/12* (2013.01); *C08J 5/2231* (2013.01); *H01M 8/1023* (2013.01); *H01M 8/1048* (2013.01); *H01M 8/1067* (2013.01); *H01M 8/1072* (2013.01); *B01D 69/02* (2013.01); *B01D 69/148* (2013.01); *B01D 2323/30* (2013.01); *B01D 2323/36* (2013.01); *B01D 2325/16* (2013.01); *B01D 2325/26* (2013.01); *B01D 2325/42* (2013.01); *C08G 61/08* (2013.01); *C08G 2261/122* (2013.01); *C08G 2261/135* (2013.01); *C08G 2261/1424* (2013.01); *C08G 2261/149* (2013.01); *C08G 2261/1529* (2013.01); *C08G 2261/3322* (2013.01); *C08G 2261/418* (2013.01); *C08G 2261/516* (2013.01); *C08G 2261/62* (2013.01); *C08G 2261/72* (2013.01);
(Continued)

(58) Field of Classification Search
CPC ........... C07F 17/02; C08F 30/04; B01J 45/00; H01M 8/1072
See application file for complete search history.

(56) References Cited

PUBLICATIONS

Wei, et al., "Electric-stimulus-responsive multilayer films based on a cobaltocenium-containing polymer", Polymer Chemistry, Aug. 8, 2014, Issue 22, 6480-6488.

(Continued)

*Primary Examiner* — Catherine S Branch
(74) *Attorney, Agent, or Firm* — Douglas L. Lineberry

(57) ABSTRACT

Chemically inert, mechanically tough, cationic metallo-polyelectrolytes designed as durable anion-exchange membranes (AEMs) via ring-opening metathesis polymerization (ROMP) of cobaltocenium-containing cyclooctene with triazole as the only linker group, followed by backbone hydrogenation to provide a new class of AEMs with a polyethylene-like framework and alkaline-stable cobaltocenium cation for ion transport, which exhibit excellent thermal, chemical and mechanical stability, as well as high ion conductivity.

8 Claims, 14 Drawing Sheets

1-1 1-2 1-3 1-4

2-1 2-2 2-3

3-1 3-2 3-3 3-4

4-1 4-2

$M^+ = Co^+, Rh^+$

Related U.S. Application Data continuation of application No. 16/151,408, filed on Oct. 4, 2018, now Pat. No. 10,940,441.

(60) Provisional application No. 62/567,878, filed on Oct. 4, 2017.

(51) Int. Cl.

| | |
|---|---|
| ***B01J 45/00*** | (2006.01) |
| ***B01J 47/12*** | (2017.01) |
| ***C08J 5/22*** | (2006.01) |
| ***H01M 8/1023*** | (2016.01) |
| ***H01M 8/1048*** | (2016.01) |
| ***H01M 8/1067*** | (2016.01) |
| ***H01M 8/1072*** | (2016.01) |
| *B01D 69/02* | (2006.01) |
| *B01D 69/14* | (2006.01) |
| *C08G 61/08* | (2006.01) |

(52) U.S. Cl.

CPC ... *C08G 2261/724* (2013.01); *C08G 2261/76* (2013.01); *C08J 2345/00* (2013.01); *C08J 2365/00* (2013.01)

(56) References Cited

PUBLICATIONS

Zhang, et al., “Charged Metallopolymers as Universal Precursors for Versatile Cobalt Materials”, Angewandte Chemie International Edition, Dec. 9, 2013, vol. 52, 13387-13391.

1-1

1-2

1-3

1-4

2-1

2-2

2-3

3-1

3-2

3-3

3-4

4-1

4-2

$M^+=Co^+$, $Rh^+$ (a)

(b)

(a)

1 2 3 4 5

*Table 1:* Properties of cobaltocenium AEMs.

| Sample | $x^{[a]}$ | $y^{[a]}$ | $IEC_{theo}$ [mmol g$^{-1}$] | $IEC_{titr}$ [mmol g$^{-1}$] | $\lambda^{[b]}$ |
|---|---|---|---|---|---|
| H-AEM$_{40}$-OH | 40 | 60 | 1.81 | 1.53 | 11.2 |
| H-AEM$_{50}$-OH | 50 | 50 | 2.02 | 1.86 | 11.6 |

[a] *x* and *y* represent molar fractions of cobaltocenium and cyclooctene units, respectively (Scheme 1 a). [b] $\lambda$ represents hydration number.

FIGURE 11

PREPARATION OF METALLOCENE CONTAINING CATIONIC POLYMERS FOR ANION EXCHANGE APPLICATIONS

BACKGROUND OF THE INVENTION

1) Field of the Invention

The current disclosure provides chemically inert, mechanically tough, cationic metallo-polyelectrolytes designed as durable anion-exchange membranes (AEMs) via ring-opening metathesis polymerization (ROMP) of cobaltocenium-containing cyclooctene with triazole as the only linker group, followed by backbone hydrogenation, and a new class of AEMs with a polyethylene-like framework and alkaline-stable cobaltocenium cation for ion transport, which exhibit excellent thermal, chemical and mechanical stability, as well as high ion conductivity.

2) Description of Related Art

Anion exchange membrane fuel cells (AEMFCs) are currently garnering renewed attention. In an AEMFC, an anion exchange membrane (AEM) conducts hydroxide (or carbonate) anions (as opposed to protons) during current flow, which results in several advantages. First, the oxygen reduction reaction (ORR) is much more facile in alkaline environments than in acidic environments. This could potentially facilitate the use of less expensive non-PGM catalysts with high stability in alkaline environments. Second, the electro-oxidation kinetics for many liquid fuels (including non-conventional choices of importance to the military, such as sodium borohydride) are enhanced in an alkaline environment. Third, the electroosmotic drag associated with ion transport opposes the crossover of liquid fuel in AEMFCs, thereby permitting the use of more concentrated liquid fuels. This is an advantage for portable applications. Fourth, the flexibility in terms of fuel and ORR catalyst choice also expands the parameter space for the discovery of highly selective catalysts that are tolerant to crossover fuel. These potential advantages make AEMFCs an attractive proposition.

AEMs have attracted much interest in recent decades because AEM fuel cells use less expensive metallic catalyst and provide higher efficiency. Various polymers are used for AEMs such as poly(ethylene oxide) (PEO), poly(phenylene oxide) (PPO), poly(benzimidazole) (PBI) and poly(phenylene) (PP) with quaternary ammonium or imidazolium cations. Many of related designs are limited by rigidity of aromatic backbones and instability of these cations in basic conditions.

Polyelectrolytes have vast applications ranging from coating to biomedical materials. Among them, cationic polyelectrolytes are widely pursued as AEMs in alkaline fuel cells for converting fuels into electricity, which can be operated below 100° C. and thus are more attractive as energy conversion devices for electric vehicles and powering portable devices.

Commonly, AEMs are copolymers containing cations that are covalently linked to hydrophobic polymer backbones. The most popular approach is the use of quaternary ammonium cation (QAC)-containing polymers. However, QACs are prone to degradation through Hofmann elimination (E2) or nucleophilic substitution ($S_N2$) under highly basic conditions. Over the past few years, several strategies have been adopted to improve the alkaline stability of AEM backbones: 1) protect ammonium cations using steric hindrance, conformational restrictions or inductive effects; 2) explore alternative stable cations such as benzyl quaternary guanidinium, imidazolium, and phosphonium to slow down degradation. However, these methods have either sacrificed ion conductivity or still faced challenges on achieving long-term stability.

Of equal importance, other components of polyelectrolytes as AEMs are also required to be stable for withstanding harsh chemical environments. A degradation or deterioration of chemical compositions of polyelectrolytes would have a catastrophic impact on membrane performance. It is essential to design novel cationic polyelectrolytes with high cation stability and superior chemical durability of the polymer framework.

Most current anion exchange materials suffer from poor mechanical and base stability. Accordingly, it is an object of the present disclosure to provide new synthesis methods for making metallocene containing polymers, as well as to improve the physical properties of these polymers. Compared to PEO, PPO, PBI and PP based polymers, the vinyl monomers of the current disclosure allow for simpler tuning of the polymer properties of metallocene-containing polymers by changing the monomer structures.

SUMMARY OF THE INVENTION

The above objectives are accomplished according to the present invention by providing in one embodiment an anion-exchange membrane comprising a cationic metallo-polyectrolyte that includes a polymer backbone with a triazole group linker between the polymer backbone and cobaltocenium and the anion-exchange membrane has a polyethylene-like framework and alkaline-stable cobaltocenium for ion transport. Further, the membrane is flexible. Still further, the polymer backbone comprises nonhydrolysable hydrocarbon. Even further, the anion-exchange membrane is not soluble in polar aprotic solvents. Further still, the polymer backbone is hydrophobic. Yet further, the anion-exchange membrane includes hydrophilic side-chains to facilitate ion transport. Moreover, ion transport is facilitated via connected ionic channels. Yet again, the anion exchange membrane exhibits increased conductivity as temperature increases.

In an alternative embodiment, a method is provided for preparing an anion-exchange membrane. The method includes performing a catalyzed click reaction to attach cobaltocenium onto a cyclic vinyl monomer, performing ring opening metathesis polymerization of the cyclic monomer, wherein the cyclic vinyl monomer comprises cobaltocenium with triazole linker groups, performing backbone hydrogenation of a resulting copolymer of the ring opening metathesis polymerization to form a hydrogenated copolymer, and producing a polyethylene-like framework and alkaline-stable cobaltocenium cation for ion transport. Further, the method includes eliminating hydrolysable functionalities from the anion exchange membrane. Still further, the method includes subjecting the hydrogenated copolymer to ion-exchange from hexafluorophosphate ($PF_6^-$) to chloride ($Cl^-$) and then to hydroxide ($OH^-$). Further yet, the cyclic vinyl monomer comprises cyclooctene. Even further, the anion-exchange membrane is not soluble in polar aprotic solvents. Still further yet, the anion-exchange membrane is flexible.

In a further alternative embodiment, an anion-exchange membrane formed via a reaction scheme as shown in FIG. 9A.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 11 shows Table 1: Properties of cobaltocenicum AEMs.

Figure 1:
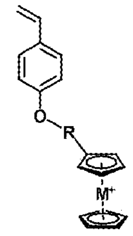
FIG. 1 shows examples of styrene, cyclooctene, norbornene and cyclic-type of cationic metallocene-containing cationic vinyl monomers and structures of multi-substituted metallocenium cations can be applied.
Figure 1:
Figure 1:
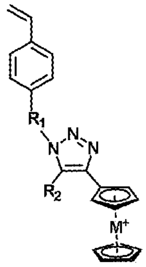
Figure 1:
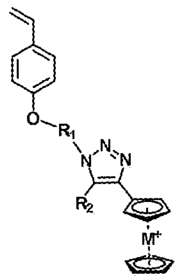
Figure 1:
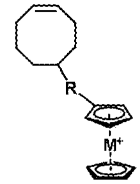
Figure 1:
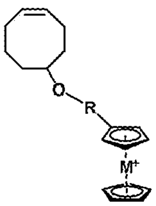
Figure 1:
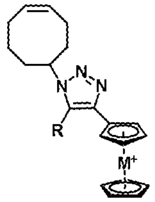
Figure 1:
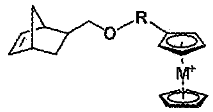
Figure 1:
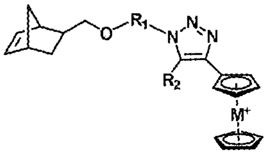
Figure 1:
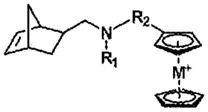
Figure 1:
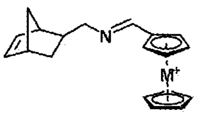
Figure 1:
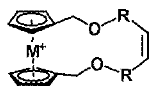
Figure 1:
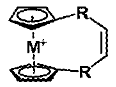

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

In various aspects, the present disclosure provides the preparation of metallocene-containing cationic monomers and polymers prepared from these monomers. Vinyl monomers prepared with metallocene cations result in polymer molecules with these cations as functional groups.

The metallocene moiety can be mono-substituted or multi-substituted cobaltocenium, rhodocenium and their derivatives. Metallocene-containing vinyl monomers include styrene, cyclooctene, norbornene and cyclic monomers. Diverse linkers can be placed between the vinyl groups and metallocene-containing functional moieties. In a preferred embodiment, the substituted cobaltocenium cation may be employed due to its extraordinary stability toward highly basic conditions.

Polymer compositions of the current disclosure include homopolymers, random copolymers, and block copolymers (linear copolymer, star copolymers, bottle-brush copolymers, etc., as known to those of skill in the art). These polymers have metallocene moiety at either side-chain or backbones.

The present disclosure provides an approach to the synthesis of metallocene-containing polymers by using different polymerization methods, and such polymers have applications in many fields, such as anion-exchange, gas separation, electrodialysis, redox flow batteries, fuel cells, etc.

More particularly, methods are provided for preparing metallocene-containing cationic vinyl monomers and polymers, wherein: (i) said metallocene-containing cationic vinyl monomers include styrene monomers, cyclooctene monomers, norbornene monomers and cyclic monomers that can be polymerized; (ii) said metallocene moiety that can be mono-substituted or multi-substituted cobaltocenium, rhodocenium and their derivatives; (iii) said homopolymers, random copolymers, block copolymers (linear copolymers, star copolymers, bottle-brush copolymers, etc., as known to those of skill in the art) that derive from polymerization of metallocene-containing cationic vinyl monomers; and (v) said homopolymers, random copolymers, block copolymers (linear copolymers, star copolymers, bottle-brush copolymers, etc., as known to those of skill in the art) that have applications as anion exchange materials for fuel cell applications.

Figure 5:
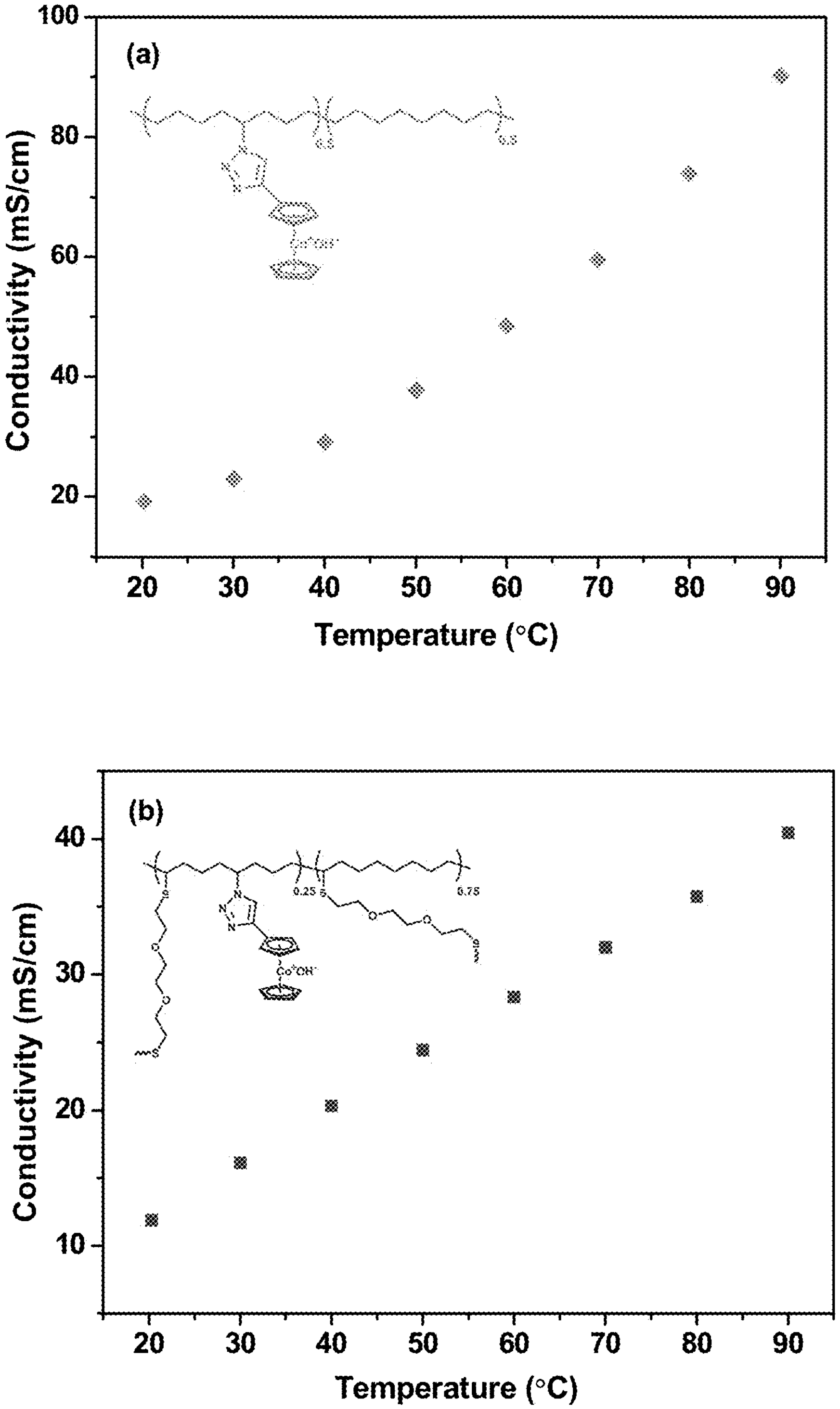
FIG. 5 shows conductivity verses temperature for hydrogenated cobaltocenium-containing copolymer (a) and crosslinked copolymer (b).
Figure 6:
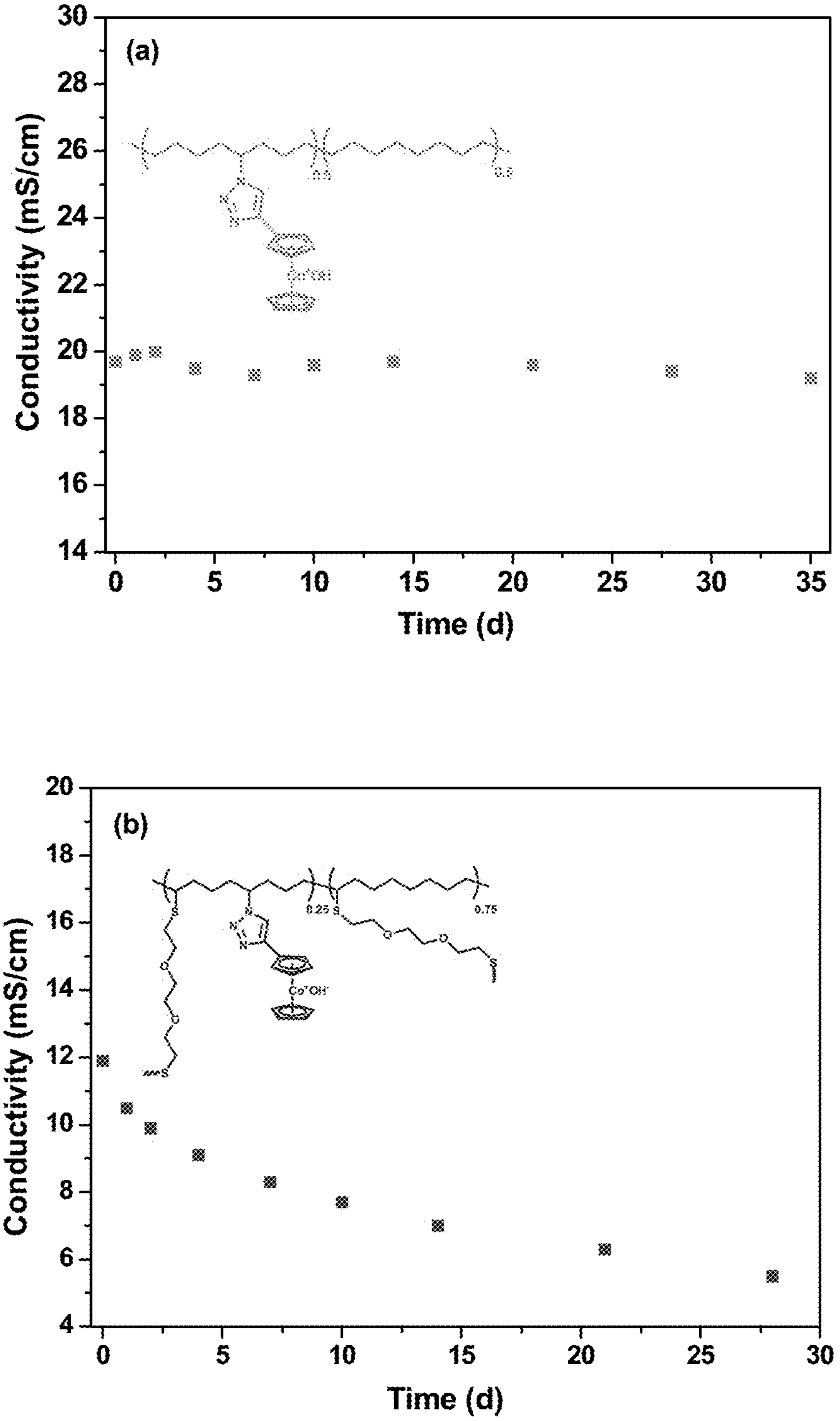
FIG. 6 illustrates conductivity verses immersed time in 80° C. 1M KOH solution for hydrogenated cobaltocenium-containing copolymer (a) and crosslinked copolymer (b).

In various embodiments, metallocene cation is attached as the side groups or in the backbones of polymers. Sidechain cationic metallocene containing polymers include styrenes, cyclooctenes and norbornenes. Main chain cationic metallocene containing polymers are generally made from cyclic metallocene monomers via ring opening polymerization (ROP). The mechanical properties and alkaline stabilities of these polymers could be further improved by crosslinking or hydrogenation. The anion conductivity is high. The disclosure is further directed to methods of its use. In on embodiment, a hydrogenated polymer was produced with 50% cobaltocenium cation loading and reached 74 mS/cm (fully hydrated condition) at 80° C. (FIG. 5) and showed no evident conductivity loss up to 35 days when the membrane was exposed to 1M KOH at 80° C. (FIG. 6).

Figure 2:
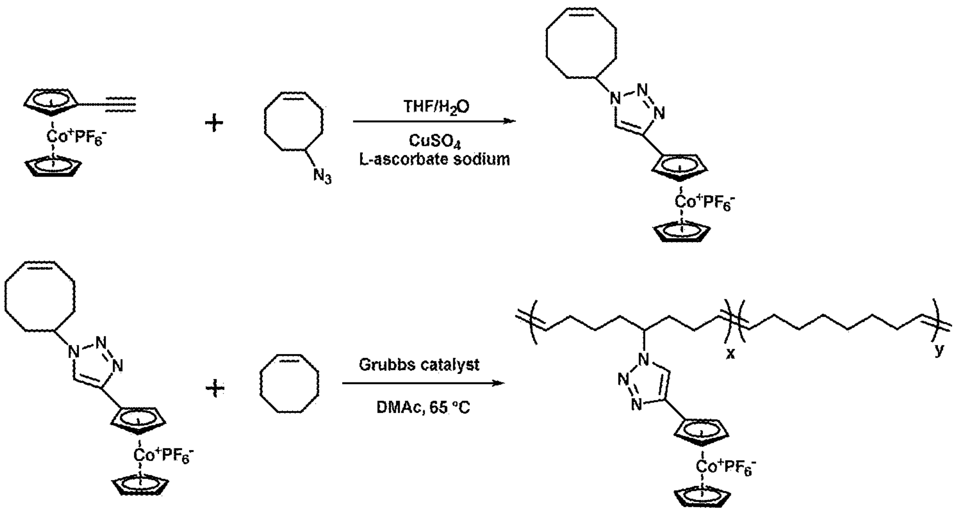
FIG. 2 shows examples of preparation of a mono- and multi-substituted cobaltocenium-containing cyclooctene monomer and copolymers.

The current disclosure demonstrates the synthesis of cationic metallocene-containing vinyl monomers. The monomers include styrenic, cyclooctene, norbornene and cyclic monomers. FIG. 1 illustrates examples of styrene, cyclooctene, norbornene and cyclic-type cationic metallocene-containing cationic vinyl monomers. A general embodiment—vinyl monomers with metallocene functional groups. Various linkers (e.g. alkane, alkene, alkyne, aromatic ring, ether, imine, amine or combination of above as the linker) can be applied between the metallocene and vinyl groups. For example, cyclooctene based cobaltocenium-containing monomer is prepared by click reaction between 5-azidocyclooct-1-ene and ethynylcobaltocenium hexafluorophosphate, as shown in FIG. 2. The metallocene cations can also be multi-substituted by methyl groups FIGS. 1. 5-1 to 5-8. (e.g. dimethyl, tetramethyl, octamethyl cobaltocenium cations). These polymers do not contain functional groups, e.g. esters and amides, that are easily hydrolyzed, decomposed or degraded under strong basic solution.

The current disclosure provides for the synthesis of metallocene-containing cationic polymers by free radical polymerization as well as other polymerization methods. For example, cyclooctene based copolymers can be prepared by ring-opening metathesis polymerization (ROMP), as displayed in FIG. 2. The molecular weight of such copolymers is in the range of 1,000 g/mol to 200,000 g/mol. These polymers can be tuned by changing the linkers between metallocene functional groups and vinyl groups, or by altering the nature of the metallocene and/or the number of the repeating units. In a preferred, ROMP is the method for preparing related polymers.

Figure 4:
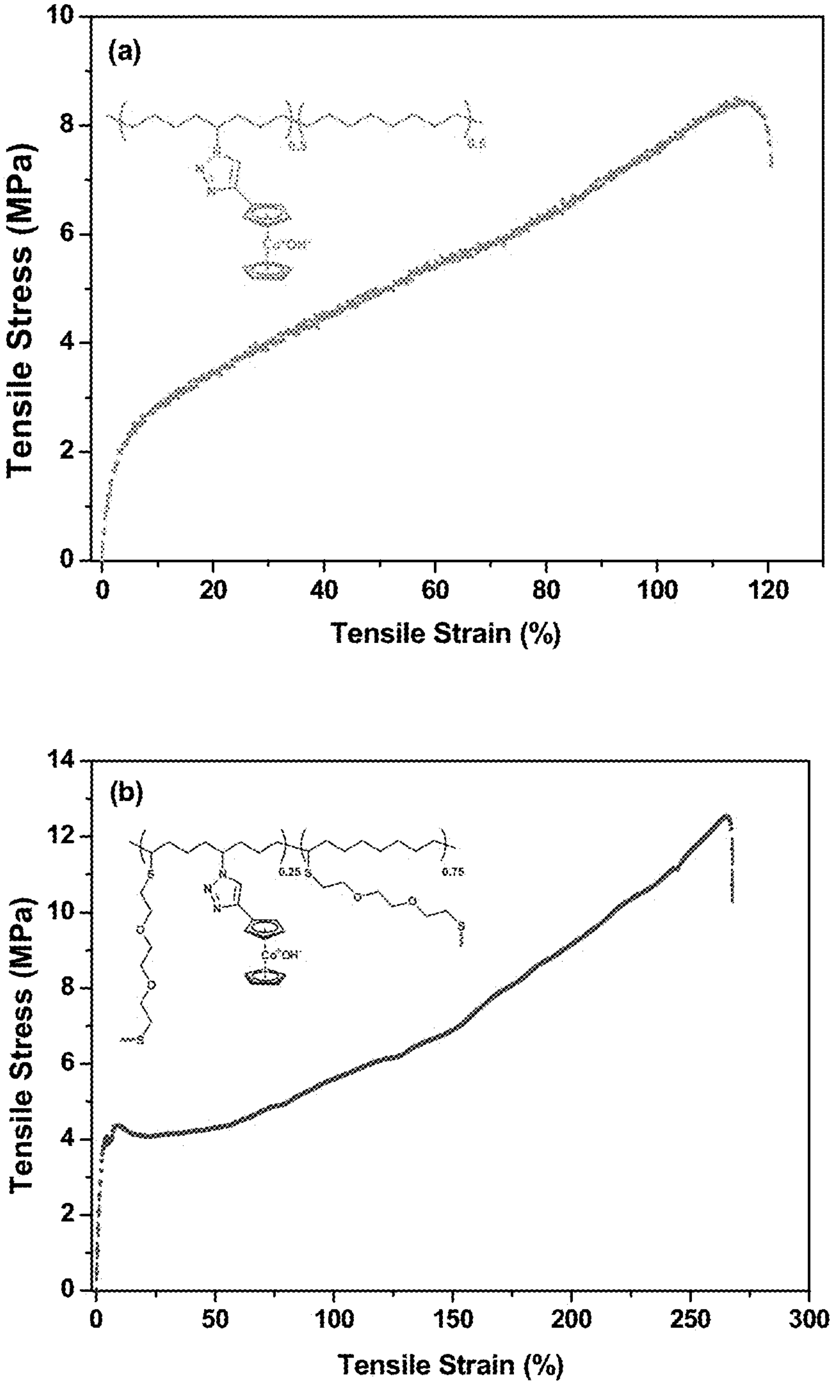
FIG. 4 demonstrates the mechanical properties of hydrogenated cobaltocenium-containing copolymer (a) and crosslinked copolymer (b).

The current disclosure has characterized the conductivity and alkaline stability of the side-chain cobaltocenium-containing copolymers. For example, one representative with 50% molar ratio cyclooctene based cobaltocenium monomer exhibits favorable mechanical (over 100% elongation) and electrical properties, especially at higher temperature, possessing a conductivity over 90 mS/cm at 90° C., as demonstrated in FIG. 4 and FIG. 5. Furthermore, over 95% of initial hydroxide conductivity of hydrated membranes was maintained after soaking in 1M KOH at 80° C. for one month, as shown in FIG. 6.

The method presented in this disclosure offers the following key features: metallocene-containing functional group can be integrated as part of vinyl monomer units; the metallocene moiety can be cobaltocenium, rhodocenium and/or their derivatives; metallocene containing vinyl monomers used for preparation of metallocene-containing cationic polymers by various polymerization methods; styrenic homopolymers, cyclooctene homopolymers, norbornene hompolymers and/or or metallocene-containing main-chain homopolymers; side-chain and main-chain cationic metallocene-containing random copolymers; side-chain and main-chain cationic metallocene-containing block copolymers, including linear copolymers, star copolymers, bottle-brush copolymers, etc., as known to those of skill in the art; and improved electrochemical properties of such cationic metallocene-containing homopolymers and various copolymers. Further, the properties of cationic metallocene-containing polymers can be tuned by changing the monomer structures (the polymerizable vinyl moiety, the linker or the metallocene moieties), compositions of various copolymers.

Figure 7:
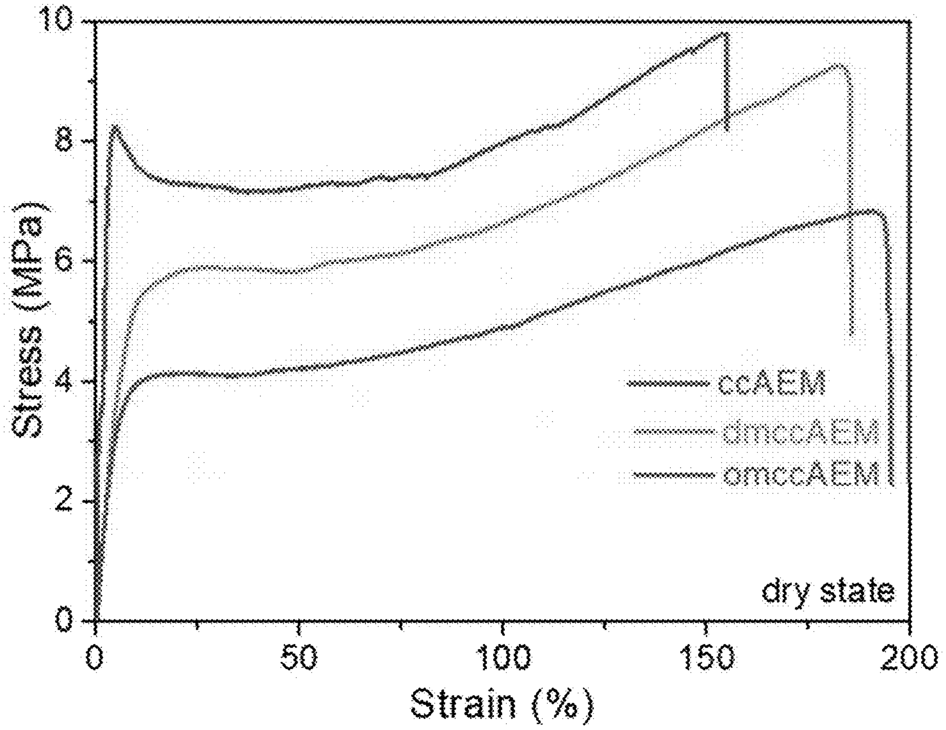
FIG. 7 shows mechanical properties of anion-exchange membranes based on multi-substituted cobaltocenium: normal cobaltocenium (blue), dimethyl-cobaltocenium (orange) and octamethyl cobaltocenium (green).

FIG. 7 shows mechanical properties of anion-exchange membranes based on multi-substituted cobaltocenium: normal cobaltocenium (blue), dimethyl-cobaltocenium (orange) and octamethyl cobaltocenium (green).

Figure 8:
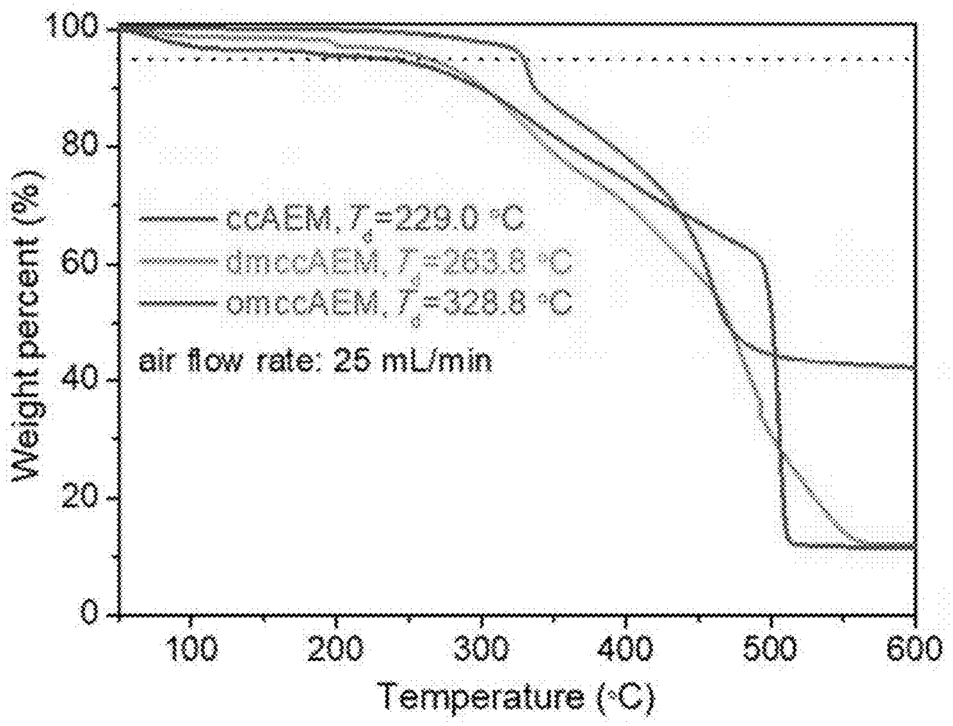
FIG. 8 shows thermal stability of anion-exchange membranes based on multi-substituted cobaltocenium: normal cobaltocenium (blue), dimethyl-cobaltocenium (orange) and octamethyl cobaltocenium (green).

FIG. 8 shows thermal stability of anion-exchange membranes based on multi-substituted cobaltocenium: normal cobaltocenium (blue), dimethyl-cobaltocenium (orange) and octamethyl cobaltocenium (green).

In a further embodiment, the current disclosure provides a new class of robust AEMs based on cobaltocenium-containing polyelectrolytes that bear promising hydroxide conductivity as well as mechanical, thermal and chemical stability. These novel membranes exhibited long-term stability that is unprecedented over many reported polymeric systems. Specifically, the current disclosure has developed side-chain cobaltocenium-containing vinyl polymers, which have nonhydrolysable hydrocarbon backbones and extraordinarily stable side chains, yet with high modulus and toughness.

Cationic cobaltocenium exhibits good stability toward harsh chemical environments in both strong acidic and basic conditions. There is negligible change in characteristic UV absorption corresponding to cobaltocenium after it was dissolved in a solution of NaOH (pH 14) or HCl (pH 1.5) for two weeks. Cobaltocenium cations with substituent group in Cp ring had superior thermal and chemical stability over other reported cations. Such extraordinary stability of cationic cobaltocenium motivated led the current disclosure to design ultrastable polyelectrolytes in both cations and other compositions of frameworks for AEMs.

To construct the new polymeric systems, one needs to avoid the integration of functional groups (e.g. ester, amide, anhydride, carbonate) and linkers that are susceptible to degradation under strong basic conditions for a prolonged period of time. Due to the instabilities of ester or imide group, most cobaltocenium polymers reported in literature could not be used as stable AEMs directly.

Metal cations have been used for AEMs with prior efforts reporting the synthesis of AEMs functionalized with bis (terpyridine)-ruthenium(II) complexes. These membranes exhibited good ion conductivity and mechanical properties. However, the decline of conductivity in alkaline condition over a long term was a concern. Others reported permethyl cobaltocenium-containing polysulfone as AEMs that exhibited extraordinary stability of cations and chemical stability of polymers. However, the ion conductivity was mediocre, partially due to the steric hindrance for the pentamethyl group. Further, these polymers were quite brittle with elongation at about 10%. Others synthesized polybenzimidazole polymers with cobaltocenium cations in the mainchain. These membranes showed improved thermal stability and ion-exchange capacity, but the mechanical and alkaline stability of these AEMs were inferior because of the poor stability of linkage groups and the rigid polymer backbones. Both approaches adopted condensation polymerization to prepare rigid polymers with relatively limited molecular weight. In addition, the synthesis was particularly laborious with low yields.

The current disclosure followed three design principles: 1) eliminate any hydrolysable functionalities; 2) maximize the content of hydrocarbon in the compositions; 3) enable polymers with controlled molecular weight. Specifically, the current disclosure used highly efficient click chemistry to attach cobaltocenium onto a cyclic vinyl monomer, which was executed for ring-opening metathesis polymerization (ROMP), see J. Zhang, Y. Yan, M. W. Chance, J. Chen, J. Hayat, S. Ma, C. Tang, Angew. Chem. Int. Ed. 2013, 52, 13387-13391; Angew. Chem. 2013, 125, 13629-13633; b) J. Wei, L. Ren, C. Tang, Z. Su, Polym. Chem. 2014, 5, 6480-6488, which is hereby incorporated by reference. The resultant polymer has only one triazole group as a linker between cobaltocenium and the polymer backbone. This powerful synthetic tool allows the preparation of high molecular weight toward mechanically flexible and tough polymers. In addition, these polymers have a polyethylene-like backbone to warrant mechanical integrity and chemical stability under harsh basic conditions.

Figure 9A:
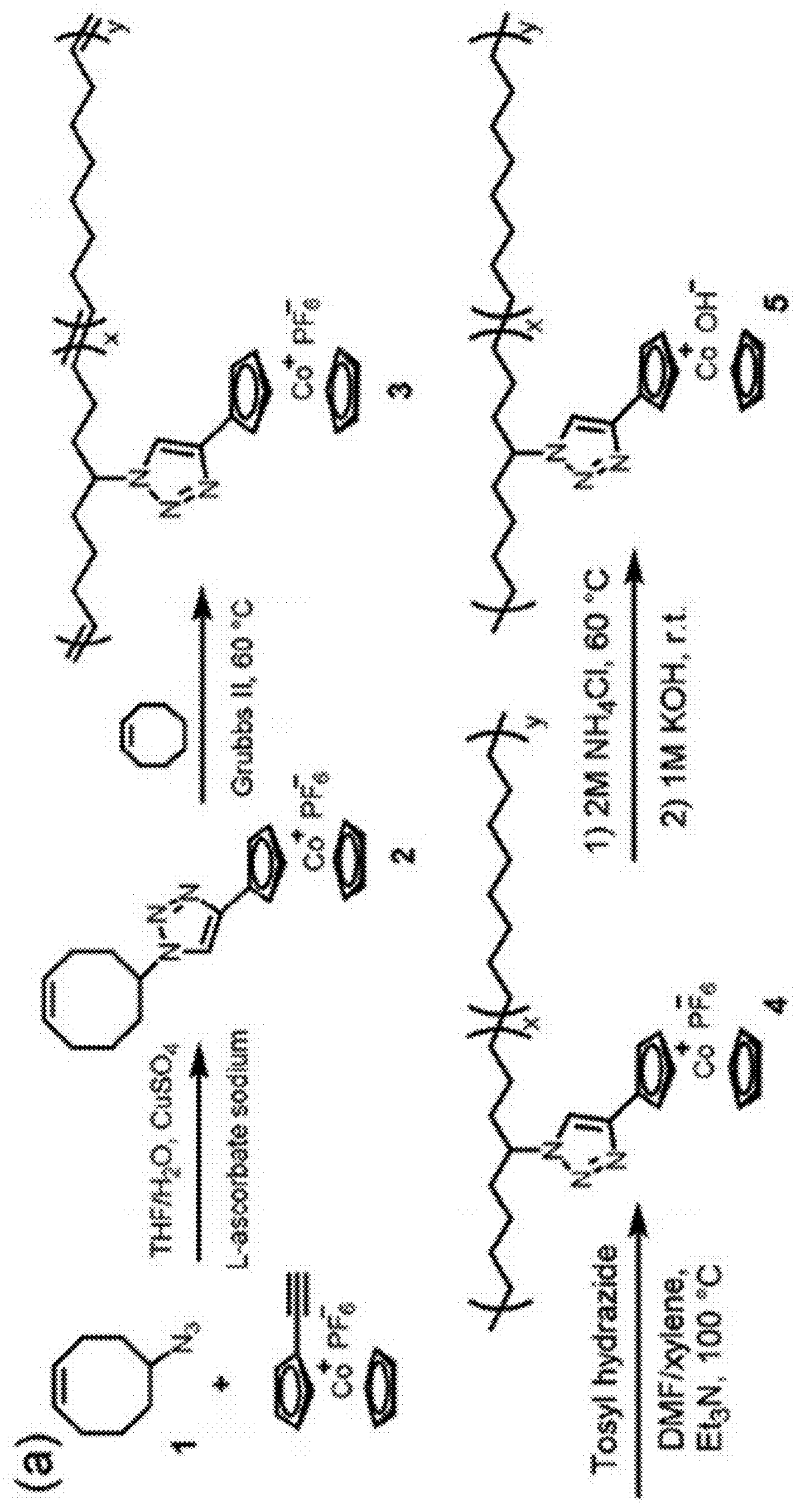
FIG. 9A shows Scheme 1, which shows synthesis of cobaltocenium monomer 2, copolymer 3 and hydrogenated polymer 4 as AEMs.
Figure 9B:
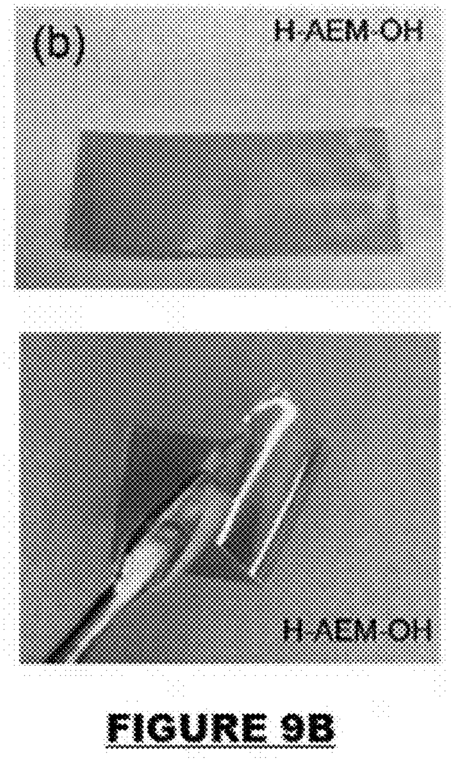
FIG. 9B shows images of transparent and flexible cobaltocenium AEMs.
Figure 9C:
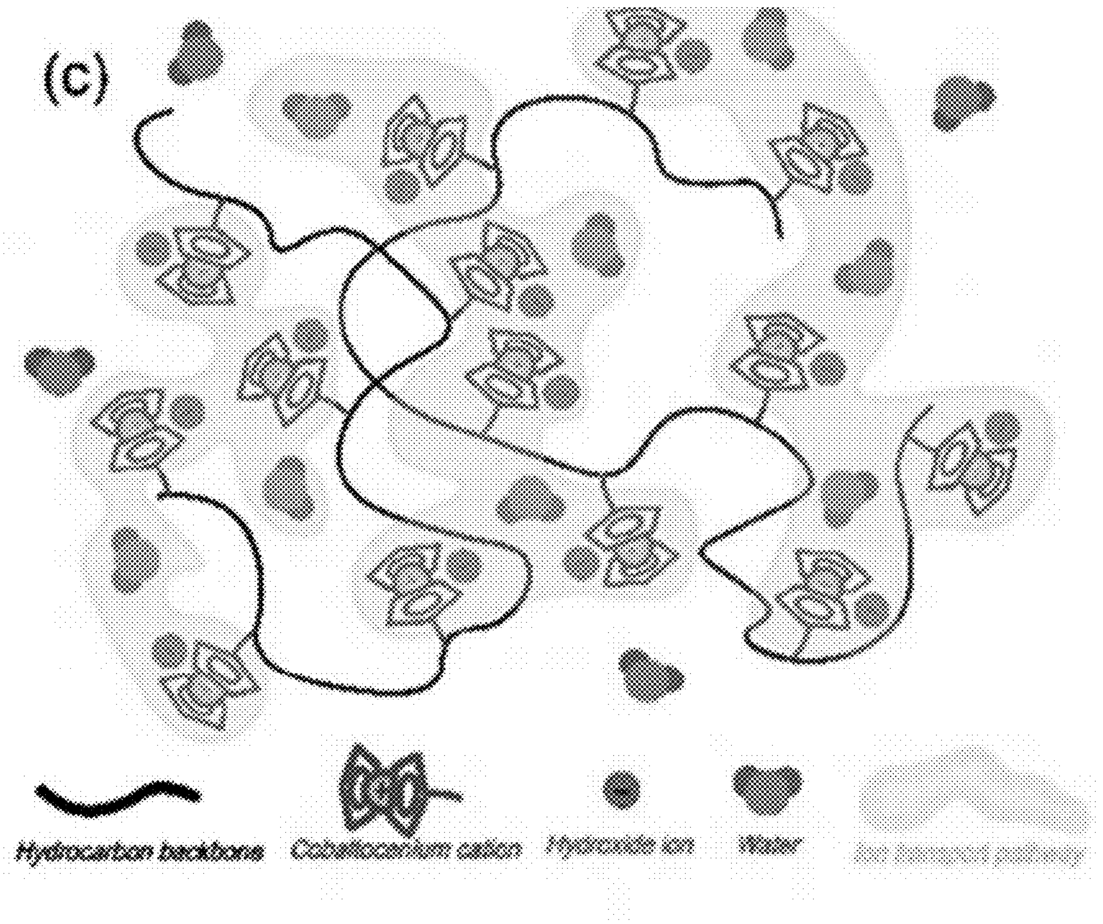
FIG. 9C shows proposed structures of cobaltocenium containing AEMS in a hydroxide solution.
Figure 10:
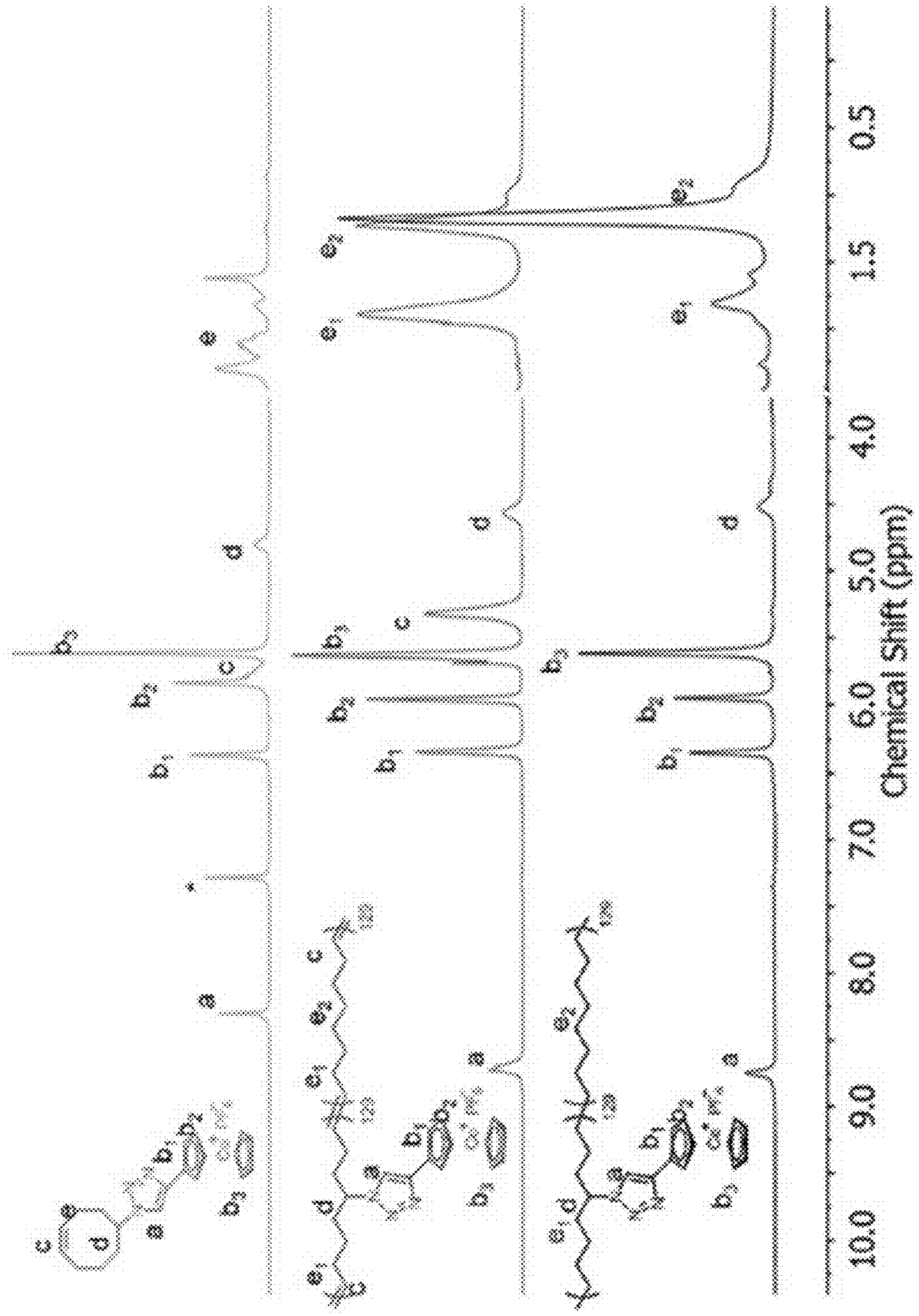
FIG. 10 shows $^1H$ NMR spectra of cobaltocenium monomer 2 (top) in $CDCl_3$, copolymer 3 (middle) and hydrogenated polymer 4 (bottom) in dimethyl sulfoxide-$d_6$.

We prepared cobaltocenium-containing cyclooctene that was subject to ROMP, as illustrated in Scheme 1, see FIG. 9A. FIG. 9A shows Scheme 1, which shows synthesis of cobaltocenium monomer 2, copolymer 3 and hydrogenated polymer 4 as AEMs. 5-Bromocyclooct-1-ene was derived from cyclooctadiene, and then converted to 5-azidocyclooct-1-ene (1). FIG. 9B shows images of transparent and flexible cobaltocenium AEMs. FIG. 9C shows proposed structures of cobaltocenium containing AEMS in a hydroxide solution. A copper-catalyzed click reaction between 1 and ethynylcobaltocenium hexafluorophosphate yielded cobaltocenium cyclooctene with a triazole as the linker (2), which was subsequently carried out for ROMP with cyclooctene as a co-monomer with the aid of Grubbs II catalyst to get a copolymer 3. The molecular weight was well controlled by adjusting the molar ratio of monomers to catalysts. In this study, we chose a polymer with molecular weight at 80000 $gmol^{-1}$, which is sufficiently high to warrant the formation of flexible membranes. The cobaltocenium monomer and cationic copolymers in hexafluorophosphate form were characterized by 1H NMR spectroscopy, see FIG. 10, which unambiguously confirmed their structures with specific assignments to each proton. FIG. 10 shows $^{1}H$ NMR spectra of cobaltocenium monomer 2 (top) in $CDCl_3$, copolymer 3 (middle) and hydrogenated polymer 4 (bottom) in dimethyl sulfoxide-$d_6$.

The presence of unsaturated bonds in the backbone of polymer 3 could be a concern on the long-term stability in alkaline conditions. The alkaline stability of this copolymer was improved by hydrogenation of the backbone. The reduction of double bonds could be confirmed with 1H NMR spectroscopy, see FIG. 10, and disappearance of characteristic absorption in the range of 1686-1796 $cm^{-1}$ in FTIR spectrum. These hydrogenated copolymers were subsequently carried out ion-exchange from hexafluorophosphate ($PF6^-$) to chloride ($Cl^-$) and then to hydroxide ($OH^-$) ion, and further fabricated to form anion exchange membranes H-$AEM_x$-OH (5) (x represents the molar fraction of cobaltocenium units in a polymer composition).

Cobaltocenium monomer 2 with $Cl^-$ anion was evaluated for its alkaline stability by UV/Vis spectroscopy, as cobaltocenium has a characteristic UV absorption at approximately 282 nm. The monomer was dissolved in 1M NaOH at 80° C. and then collected for time-dependent UV/Vis spectra. Two representative absorption peaks appeared at 282 nm and 346 nm, characteristically originated from the cobaltocenium and triazole groups, respectively. The absorption spectrum obtained after 10 days perfectly overlapped with the initial one. Both peaks maintained nearly 100% of initial intensity even after 10 d, unambiguously indicating excellent alkaline stability of cobaltocenium and triazole at elevated pH and temperatures. Furthermore, the stability of cobaltocenium monomer 2 was confirmed by $^{1}H$ NMR and mass spectrum after exposure in alkaline conditions. The current noticed that proton-deuterium exchange occurred on protons from both aromatic rings and alkenes in the monomer structure, while no signals indicated any degraded products. This kind of proton-deuterium exchange is reversible and does not lead to any structural degradation. All above stability tests suggested cobaltocenium is a stable cation suitable for AEM applications.

For cobaltocenium-containing polymers, direct anion exchange from hydrophobic $PF_6^-$ to hydrophilic $OH^-$ was challenging. The current disclosure resolved this problem by first exchange to $Cl^-$ in 2 M aqueous solution of $NH_4Cl$ at 60° C. Then, exchange from $Cl^-$ to $OH^-$ was carried out by immersing polymer membranes into 1 M NaOH solution. Complete ion-exchange was confirmed by ion exchange capacity (IEC) titration, see FIG. 11, Table 1: Properties of Cobaltocenium AEMS, and Energy Dispersive X-ray (EDX) characterization. These membranes were yellow in color, flexible and transparent, see FIG. 9B. All membranes after anion exchange were not soluble in water or other polar aprotic solvents like dimethylacetamide and acetonitrile.

Figure 12:
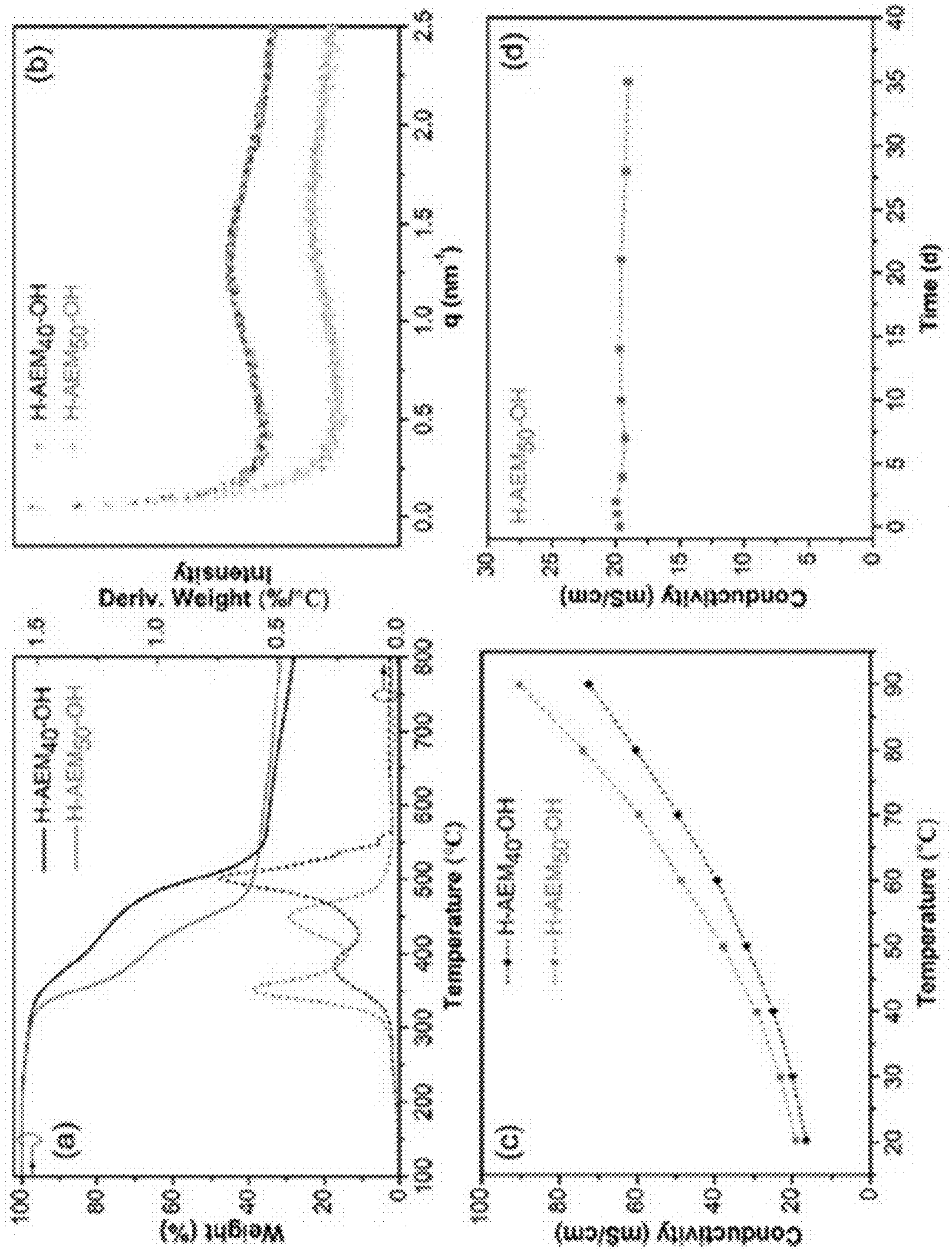
FIG. 12 shows cobaltocenium AEMS: (a) TGA and DTG curves; (b) SAXS profiles; (c) hydroxide conductivity of membranes as function of temperature in fully hydrated condition; and (3) room temperature conductivity as a function of immersion time of membranes in 1 M NaOH solution at 80° C.

The thermal stability of cobaltocenium-containing polymers was studied by thermogravimetric analysis (TGA), see FIG. 12 at (a). FIG. 12 shows cobaltocenium AEMS: (a) TGA and DTG curves; (b) SAXS profiles; (c) hydroxide conductivity of membranes as function of temperature in fully hydrated condition; and (3) room temperature conductivity as a function of immersion time of membranes in 1 M NaOH solution at 80° C. The decomposition of hydrogenated H-$AEM_x$-OH membranes in $N_2$ atmosphere consisted of two different stages and occurred only well above 300° C. The 5% weight-loss decomposition temperature ($T_d$) of H-AEM40-OH and H-AEM50-OH were 347° C. and 328° C., respectively. In comparison, many reported AEMs with ammonium or imidazole cations have much lower decomposition temperature for their cations (<200° C.). See) D. Guo, A. N. Lai, C. X. Lin, Q. G. Zhang, A. M. Zhu, Q. L.

Liu, ACS Appl. Mater. Interfaces 2016, 8, 25279-25288; b) H. Wu, W. Jia, Y. Liu, J. Mater. Sci. 2017, 52, 1704-1716; c) Q. Ge, J. Ran, J. Miao, Z. Yang, T. Xu, ACS Appl. Mater. Interfaces 2015, 7, 28545-28553. The results of the current disclosure disclose both cobaltocenium cations and the hydrocarbon backbone have excellent thermal stability.

Mechanical properties of AEMs are largely dependent on the choice of polymer backbones. For well-studied poly(p-phenylene oxide), polybenzimidazole, and polystyrene based AEMs, the tensile strain at break is usually lower than 80% due to their rigid aromatic backbones. While for flexible poly(4-methyl-1-pentene) based films, the tensile strength is relatively low. The current disclosure provides sturdy and tough cobaltocenium polymers: flexible and strong. Mechanical properties of cobaltocenium AEMs were characterized at 80% RH and under ambient temperature. Both $HAEM_{40}$-OH and H-$AEM_{50}$-OH retained tensile strain over 120% attributed to the existence of a highly flexible backbone.

These cobaltocenium membranes were expected to have phase separation due to immiscibility of the hydrophobic backbone and hydrophilic side chain in the copolymers. Small-angle X-ray scattering (SAXS) was used to investigate the morphology of cobaltocenium membranes, see FIG. 12 at (b). Both of the membranes exhibited a broad primary scattering peak around q*=1.28 and 1.54 $nm^{-}1$ with a d spacing (2π/q*) of 4.9 and 4.1 nm. The lack of higher orders of scattering peaks implied that the phase separation is probably short range correlated, which is reasonable given the membranes are not block copolymers. Atomic force microscopy (AFM) images also confirmed the microphase separation between hydrophilic and hydrophobic domains under spin casting conditions. The dark areas represent the soft matrix from polyethylene backbone, whereas the brighter ones represent hard domains from cobaltocenium side chains. Such phase-separated morphology is essential for anion exchange materials with desirable properties. The hydrophobic backbone provided mechanically flexible and chemically stable scaffolds, whereas the hydrophilic side-chains facilitated ion transport through connected ionic channels.

Even under high cation loading, side-chain cobaltocenium AEMs still exhibited relatively low water uptake and swelling ratio especially at room temperature, which can be explained by the hydrophobic nature of polyethylene-like backbone. Furthermore, the number of absorbed water molecules per cobaltocenium cation was calculated to be in the range of 11.2 to 11.6, and showed a tendency of slight increase with higher IEC, see FIG. 11. Hence, both cobaltocenium copolymers showed good resistance to water uptake at various temperature. Such water management property could play a critical role in forming ion conducting pathways, see FIG. 9C, and ensure the membranes to be dimensionally stable over a long term. While for many quaternary ammonium or phosphonium polymers, high cation loading for better electrical property much more hydrophilic and absorbs excess water, which in turn sacrifices the overall stability. The current disclosures results on cobaltocenium AEMs indicated the possibility of simultaneously making high IEC and having good water management properties.

The hydroxide conductivity of membranes with different loading of cobaltocenium cation as a function of temperature is shown in FIG. 12(*c*). Both membranes showed steadily increased conductivity at elevated temperature likely due to higher water uptake and faster ion migration. The hydroxide conductivity of H-$AEM_{40}$-OH and H-$AEM_{50}$-OH reached fairly high values at 90° C.: 72 and 90 $mScm^{-1}$, respectively. Considering the processability and durability of membranes, the current disclosure only incorporated up to 50 mol % cobaltocenium in copolymers at this stage. It could be possible to achieve even higher hydroxide conductivity by increasing the IEC and optimizing the compositions of copolymers. Moreover, the hydroxide conductivity at different temperature generally followed an Arrhenius relationship. The activation energy for ion transport was calculated to be 19.2 to 20.2 $kJmol^{-1}$.

The alkaline stability at high operating temperature has always been a key concern for AEMs. For polymers prepared through ROMP, the unsaturated double bond in repeating units is considered to not only limit the chain flexibility, but also make membranes less stable under harsh basic conditions. The current disclosure employed direct hydrogenation to reduce the double bonds in the polymer backbone. In addition, polymers with polyethylene-like backbone exhibited improved durability and ductility. H-$AEM_{50}$-OH was chosen for the long-term stability test because of its higher ion capacity and hydroxide conductivity. FTIR spectra showed that all chemical structures of membranes remained almost unchanged before and after the test. Moreover, initial hydroxide conductivity of hydrated membranes was maintained over 95% after soaking in 1 M NaOH at 80° C. for one month, see FIG. 12 at (d), indicating their superior chemical and mechanical stability.

In summary, a new design for anion-exchange membranes was achieved using metallo-polyelectrolytes containing cationic cobaltocenium with a polyethylene-like backbone and a non-hydrolysable linker. These copolymers were prepared via ROMP in conjunction with hydrogenation of polymer backbones. These membranes exhibited long-term durability with excellent mechanical toughness and flexibility, great chemical stability of cations and the rest of polymer compositions, as well as good ion conductivity. This work demonstrated that side-chain cobaltocenium polymers can be used as a candidate for new-generation anion-exchange membrane materials in fuel cell applications.

The copolymers of the present disclosure exhibit improved mechanical properties, alkaline stability and swelling behavior. All of these may be may be tuned by crosslinking or hydrogenation reactions.

Examples of such cationic metallocene-containing vinyl monomers and their polymers are described below.

Example 1

This example is to prepare a cyclooctene based cobaltocenium-containing monomer (see FIG. 2). A typical procedure for the synthesis is described as follows: 5-azidocyclooct-1-ene and ethynylcobaltocenium hexafluorophosphate (mono-substituted or multi-substituted) are dissolved in tetrahydrofuran (THF)/$H_2O$, followed by adding copper sulfate and sodium ascorbate under the protection of nitrogen gas at 0° C. The resulting mixture is stirred at room temperature overnight to yield cyclooctene based cobaltocenium-containing monomer.

Example 2

This example is to prepare cyclooctene based cobaltocenium-containing monomer based copolymers (see FIG. 2). The monomers are polymerized by ROMP using Grubbs $2^{nd}$ catalyst and N,N-dimethylacetamide as solvent at 65° C.

under nitrogen. The obtained polymers were precipitated in methanol several times to remove catalysts and other impurities.

Example 3

Figure 3:
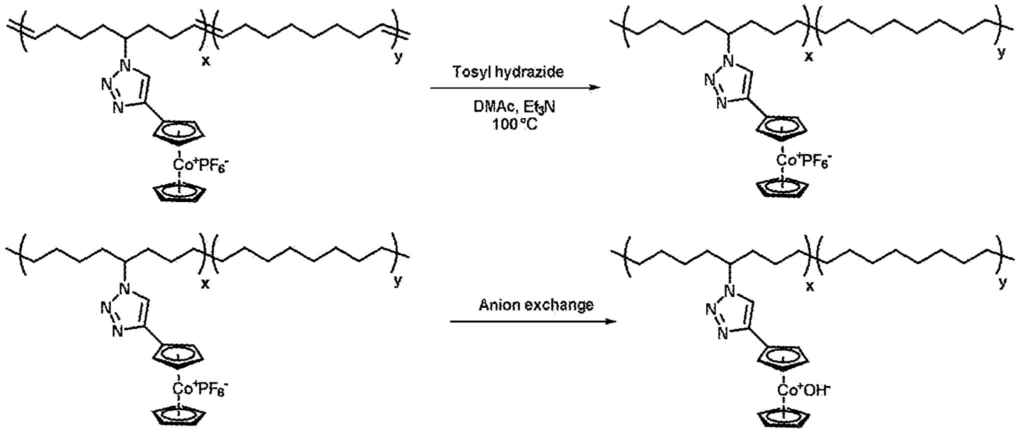
FIG. 3 shows examples of improving the properties of cobaltocenium copolymers by hydrogenation (a) and crosslinking (b).
Figure 3:
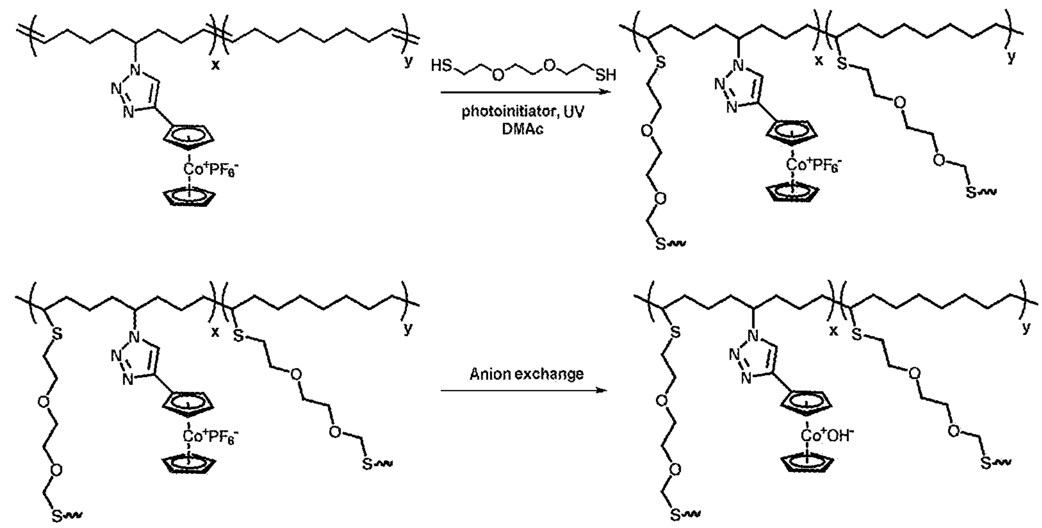

This example is to improve the mechanical and alkaline stability for homopolymers/copolymers (see FIG. 3 at a). The current disclosure demonstrated that hydrogenation of backbones is an efficient way to improve the properties of these metallocene polymers. As seen in FIG. 3, the copolymers could be hydrogenated using excess tosyl hydrazide and N,N-dimethylacetamide as solvent at 100° C. under nitrogen or under hydrogen gas. The resulting polymers are precipitated in methanol three times to remove impurities. Similarly, hydrogenation can be applied to other multi-substituted cobaltocenium copolymers to prepare AEMs, like dmccAEM and omccAEM shown in this FIG. 3.

Example 4

This example is to improve the mechanical and alkaline stability for homopolymers/copolymers (see FIG. 3 at b). The current disclosure demonstrated that by crosslinking of polymer backbones, the properties of anion exchange membranes are largely improved. As seen in FIG. 3 at b, the copolymers were dissolved in N,N-dimethylacetamide and purged nitrogen for 15 mins. Dithiol crosslinker and photoinitiator were added successfully and stirred under UV light overnight. The solution was then directly cast on a Teflon film and evaporated the solvent to obtain the film for anion exchange.

Example 5

This example is to improve the electrochemical properties, thermal stability and alkaline stability for homopolymers/copolymers (see FIGS. 7 and 8). The ccAEM, dmccAEM and omccAEM represent anion-exchange membrane based on cobaltocenium, dimethyl cobaltocenium and octamethyl cobaltocenium respectively. The current disclosure demonstrated that by using multi-substituted cobaltocenium cations, the properties of anion exchange membranes can be tuned. The preparation of multi-substituted cobaltocenium-based anion-exchange membranes are similar as mention before.

The above examples show that many other polymer systems may be applied in a similar fashion to obtain controlled properties. The strategy described here not only offers the diversity of structures of different monomer and polymer systems, but also tailored properties. The implementation of this strategy enables cationic metallocene-containing polymers for anion exchange membranes.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An anion-exchange membrane comprising at least one copolymer formed via a reaction scheme comprising:

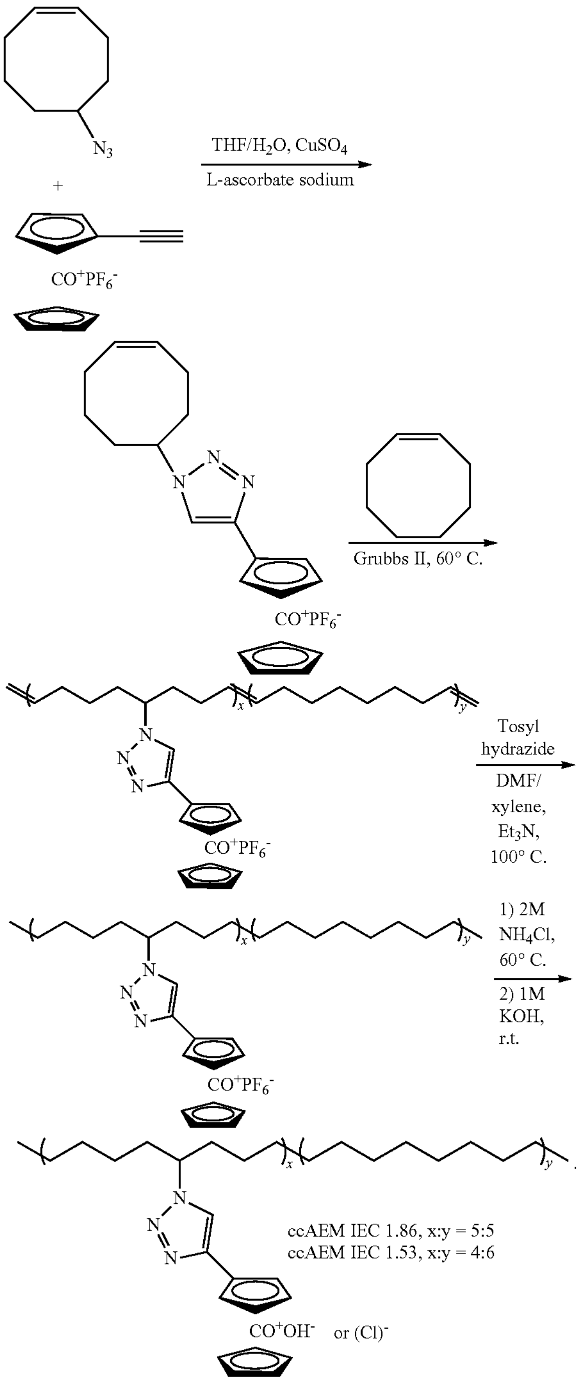

2. The anion-exchange membrane of claim 1, wherein the anion-exchange membrane is not soluble in polar aprotic solvents.

3. The anion-exchange membrane of claim 1, wherein the anion-exchange membrane is flexible.

4. The anion-exchange membrane of claim 1, wherein the anion-exchange membrane is incorporated into a fuel cell.

5. The anion-exchange membrane of claim 1, wherein the anion-exchange member exhibits one hundred percent elongation.

6. The anion-exchange membrane of claim 1, wherein the anion-exchange member exhibits conductivity over 90 mS/cm at 90° C.

7. The anion-exchange membrane of claim 1, wherein a number of absorbed water molecules per cobaltocenium cation ranges from 11.2 to 11.6.

8. The anion-exchange membrane of claim 1, wherein the anion-exchange exhibits an initial hydroxide conductivity over 95% after soaking in 1 M NaOH at 80° C. for one month.

* * * * *